United States Patent [19]

MacInnes et al.

[11] Patent Number: 4,568,277

[45] Date of Patent: Feb. 4, 1986

[54] APPARATUS FOR HEATING OBJECTS TO AND MAINTAINING THEM AT A DESIRED TEMPERATURE

[75] Inventors: Robert D. MacInnes, West Redding, Conn.; Carlos C. Periu, Boca Raton, Fla.; Robert L. Rohr, Scarsdale, N.Y.

[73] Assignee: International Business Machines Corporation, Armonk, N.Y.

[21] Appl. No.: 563,434

[22] Filed: Dec. 20, 1983

[51] Int. Cl.⁴ .......................... F27B 3/02; H05B 1/00; B23K 31/02
[52] U.S. Cl. .................................... 432/120; 219/209; 228/220
[58] Field of Search ........................ 219/209; 422/199; 228/220; 432/120

[56] References Cited

U.S. PATENT DOCUMENTS 3,601,884  8/1971  Kemeny .............................. 228/220

FOREIGN PATENT DOCUMENTS 2364417  4/1978  France ................................. 432/120

*Primary Examiner*—John J. Camby
*Attorney, Agent, or Firm*—Pollock, Vande Sande and Priddy

[57] ABSTRACT

An improved apparatus and method are disclosed for heating objects, such as electronic chips being bonded to substrates, in which a copper heat exchanger element (12) comprises a circuitous interior passage (26) through which gases pass from a source (30) to be heated by a heater (74) to a desired temperature and to be cleansed of unwanted oxygen by catalytic reaction, prior to entering a furnace chamber (22) heated from below by the heat exchanger element (12) and from above by a further heater (72) and copper plate (60), whereby essentially uniform gas temperature, acceptably low oxygen concentration and fast cycling times are provided in the furnace chamber (22). See FIG. 1.

25 Claims, 9 Drawing Figures

APPARATUS FOR HEATING OBJECTS TO AND MAINTAINING THEM AT A DESIRED TEMPERATURE

TECHNICAL FIELD

The invention concerns an apparatus and a method for heating objects, such as electronic chips being bonded to substrates, to a desired temperature and for maintaining such objects essentially isothermally at this temperature in an essentially oxygen-free atmosphere.

BACKGROUND ART

Various apparatuses and methods have been developed for brazing and soldering together the elements of a larger structure. In some instances, the braze or solder material first is applied in solid form at the contacting parts of the elements. Then the assembled structure is placed in a suitable furnace where the temperature is raised to the fusion temperature of the braze or solder material and then lowered until the material fuses again to join the structural elements. In such familiar applications, both fluxed and fluxless joining materials have been used, in accordance with the characteristics of the furnace and the desired properties of the completed structure.

For example, Kendziora et al. U.S. Pat. No. 3,882,596 discloses an apparatus for fluxless soldering aluminum-containing workpieces in a controlled atmosphere. A complex continuous belt furnace with air locks at either end heats the workpieces by means of electrical heaters within the furnace. Additional heat is added by a separately preheated, controlled atmosphere of nitrogen or argon which flows into the furnace through conduits which may be of copper. Typically, such belt furnaces heat up quickly and have low cycle times, but their temperatures and the contents of their atmospheres are hard to control. More recently, Wagner U.S. Pat. Nos. 4,140,266 and 4,231,508 disclose an apparatus for fluxlessly soldering aluminum plates of a heat exchanger. An inert gas such as nitrogen is preheated to a temperature near the soldering temperature and then flowed through the stack of plates to achieve sufficient heating for soldering.

In the manufacture of today's high density electronic devices, integrated circuit chips have been attached to supporting substrates using both fluxed and fluxless solders. Various fluxes and various ambient atmospheres, including nitrogen, forming gas (90% nitrogen and 10% hydrogen) and hydrogen, have been used in continuous belt furnaces for such chip joining. However, when single chips are joined using flux to a multichip module, multiple reflows of the solder joints will typically occur, causing the solder joints to degrade and resulting in increased resistance and decreased strength.

As reported by D. A. Chance in IBM Technical Disclosure Bulletin Vol. 23, No. 7A, page 2990, of December, 1980, reflow solder joints can be made without flux in a properly controlled atmosphere. Chance found that the forming gas used in earlier chip joining processes was often contaminated with other gases and vapors including oxygen and water. To remove the oxygen, Chance used a quartz tube heated to 540° C. and filled with platinum wires, through which the forming gas was flowed prior to introduction into the chip joining furnace. Low partial pressures of oxygen resulted due to the catalytic effect of the hot platinum, which caused the oxygen to react with hydrogen to form water. In the chip joining furnace, the chips were supported on their substrates which rested on a copper platen heated by an infrared heater. A rather large furnace chamber surrounded the chips and substrates, apparently requiring the use of a vacuum system to remove the air in the chamber at the start of the joining process.

While such prior art methods and apparatuses have achieved a measure of success for their specific applications, problems have continued to exist when electronic chips are to be bonded to substrates. Although rapid heating of the chip and substrate has been possible in many cases, maintenance of a relatively uniform temperature distribution across the substrate and chips has been difficult to achieve. Such uniformity is important in many applications to ensure that the solder materials are not heated so far beyond their fusion temperature that they are degraded during reflow cycles. For example, in the system disclosed by Chance, the infrared heaters depend upon adequate thermal conductivity to heat the chips and substrates. While Chance's copper platen helps in this regard, the poor conductivity of the substrate interferes with uniform delivery of heat to the site of the chips where the solder reflow must take place. In addition, the gas used by Chance apparently enters the furnace at an uncontrolled temperature; and the furnace has a thin cover which would cause uncontrolled heat loss.

Thus, a need has continued to exist for a method and apparatus for heating objects, such as electronic chips to be joined to substrates, in which not only low oxygen content and fast heating rates, but also fast heat-up/cool-down cycles and essentially uniform temperature distributions are achievable.

SUMMARY OF THE INVENTION

The primary object of the invention is to provide an improved furnace and method for joining electronic chips to insulating substrates without unacceptable degradation of solder joints.

A further object of the invention is provide such an improved furnace and method in which the atmosphere flowing through the furnace has an extremely low oxygen content, in order to prevent oxidation of the parts during joining.

Still another object of the invention is to provide such a furnace and method suitable for heating multiple-layered ceramic substrates at essentially uniform temperatures and with reasonable speed.

A still further object of the invention is to provide such a furnace and method in which the time required to heat up the furnace, complete the joining of the parts and cool down the furnace is held to a minimum.

Yet another object of the invention is to provide such a furnace which is small, inexpensive and simple to construct so that the use of multiple batch furnaces is economically justifiable compared to a single continuous belt furnace.

Still another object of the invention is to provide such a furnace in which the alignment of individual chips on the substrate can be checked and corrected readily before the furnace is closed.

A still further object of the invention is to provide such a furnace and method in which the consumption of gas flowing through the furnace and the consumption of electrical power for heating the furnace are held to minimum values.

Finally, an object of the invention is to provide such an improved furnace which is readily automated.

These objects of the invention are given only by way of example; therefore, other desirable objectives and advantages inherently achieved by the disclosed structure and process may occur or become apparent to those skilled in the art. Nonetheless, the scope of the invention is to be limited only by the appended claims.

The apparatus according to the invention is particularly suited for rapidly heating objects, such as electronic chips being bonded to substrates by application of heat, to a desired temperature and for maintaining the objects essentially isothermally at the desired temperature in an essentially oxygen-free atmosphere. A source of gas comprising hydrogen and having a low oxygen content is used. A heat exchanger member is formed, at least in part, from a material such as copper which catalyzes combination of oxygen and hydrogen. The heat exchanger member comprises a circuitous interior passage having walls formed at least in part from such a catalytic material, the passage being connected to the source of gas. The upper surface of the heat exchanger member supports the objects during heating. Means are provided for applying heat to the heat exchanger member and its interior passage and for directing the gas from the interior passage across the upper surface to heat the objects supported thereon. As a result, the oxygen content of the gas is substantially removed by catalysis under the influence of the catalytic material, as the gas flows through the interior passage. Simultaneously, the temperature of the gas is raised to the desired temperature before the gas leaves the interior passage through the means for directing it across the upper surface of the heat exchanger member. Means are operatively associated with the heat exchanger member for enclosing its upper surface to define a heating chamber within which the gas flows across the objects to maintain them at the desired, essentially isothermal temperature. Finally, means are provided for exhausting the gas from the chamber.

In the preferred embodiment, the heat exchanger member comprises a base plate formed from a metal of high thermal conductivity, the base plate having a first, lower surface for contacting the means for applying heat and a second, upper surface, the circuitous interior passage opening through the second, upper surface. A cover plate, also formed from a metal of high thermal conductivity and comprising the previously mentioned upper surface, closes the interior passage. Preferably, the base plate comprises a central heat conducting column which extends upwardly and contacts the cover plate, so that heat is conducted directly to the central area of the cover plate to heat the object on its upper surface. As a result, a single heating means acts both to heat the gases in the interior passage by convection and to heat the objects of the upper surface by conduction.

The means for enclosing the upper surface of the heat exchanger element comprises a plate made from a metal having a high thermal conductivity, the plate having a lower surface spaced from the upper surface of the heat exchanger element. Means for applying heat to this upper plate are provided, as well as means for sealing the periphery of the chamber. Preferably, the means for applying heat to the heat exchanger element and the upper plate comprise two identical, electrically powered heating elements which are electrically connected in parallel.

The furnace according to the invention is particularly well-suited for automatic control; so, means such as a thermocouple are provided for measuring the temperature within the furnace chamber so that the heating elements can be controlled to operate in a preselected manner. Also, means are provided for sensing the oxygen content of gases leaving the furnace chamber so that heating of the furnace can be terminated if the oxygen content reaches an unacceptable level.

In accordance with the method of the invention, a heat exchanger member is provided which is formed at least in part from a material which catalyzes combination of oxygen and hydrogen. The heat exchanger member comprises a circuitous interior passage with walls formed at least in part from such a material and is enclosed at its upper surface to define a heating chamber. Gas comprising hydrogen and a small, but undesired, amount of oxygen is passed through the circuitous interior passage while heat is applied to the heat exchanger member. Thus, the temperature of the gas is raised to a desired level while its low oxygen content is removed by catalysis. Gas leaving the circuitous passage is passed over objects resting on the upper surface of the heat exchanger element so that the objects are maintained at an essentially isothermal temperature. Heating rates as high as 45° C. per minute and a low temperature variation of about 2° C. across the object being heated, are achievable in accordance with the method of the invention. Thus, the object is held at an essentially isothermal temperature. The oxygen content of the gas exhausting from the furnace chamber is continuously monitored to detect leakage of oxygen into the chamber and the application of heat to the heat exchanger element is terminated when the oxygen content exceeds a preselected limit.

BRIEF DESCRIPTION OF THE DRAWINGS

The foregoing and other objects, features and advantages of the invention will be apparent from the following more particular description of the preferred embodiments thereof, as illustrated in the accompanying drawings.

DESCRIPTION OF THE PREFERRED EMBODIMENTS

Figure 1:
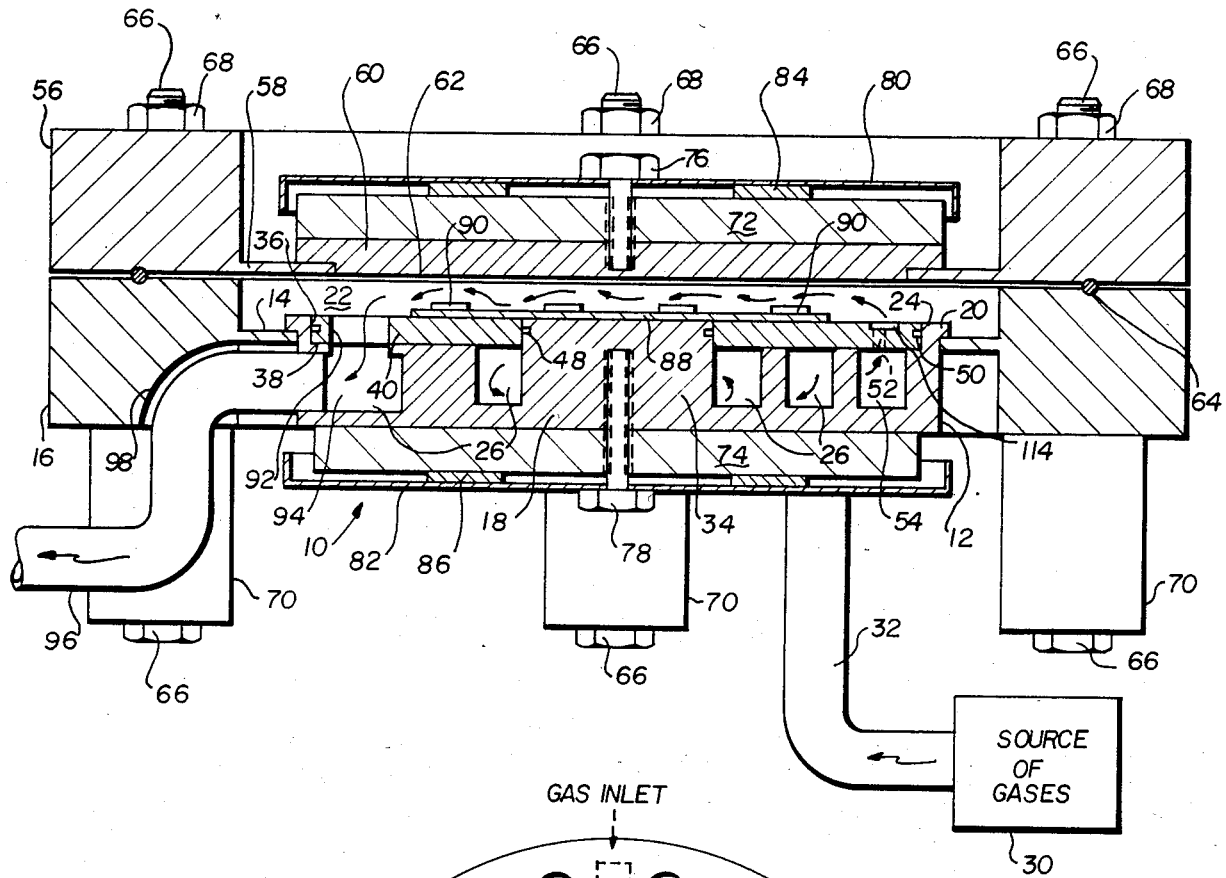
FIG. 1 shows an elevational view, primarily in section, of a heating apparatus or furnace according to the present invention, the view being taken along a section line corresponding line 1—1 in FIG. 2.

The following is a detailed description of the preferred embodiments of the invention, reference being made to the drawings in which the same reference numerals identify the same elements of structure in the several Figures.

As shown in FIGS. 1 to 3D, a heating apparatus or furnace 10 according to the invention comprises a heat exchanger member 12 supported on a radially inwardly projecting flange 14 of a lower, circumferentially extending annular support flange 16 A suitable corrosion resistant material such as stainless steel is preferred for flange 16. For ease of manufacture, the various components of the furnace preferably are circular or annular in configuration; however, other shapes may be used without departing from the scope of the invention. Flange 14 preferably is rather thin, say, about 0.0625 inch (0.159 cm), to minimize heat loss by conduction to flange 16. Heat exchanger member 12 comprises a base plate 18 preferably made from solid copper or other material which catalyses the combination of oxygen and hydrogen. At its upper edge, base plate 18 includes a radially outwardly projecting flange 20, the underside of which rests on the upper surface of flange 14.

The diametral clearance between the inside diameter of flange 14 and the outside diameter of base plate 18 below flange 20 preferably is quite small, say 0.001 to 0.002 inch (0.00254 to 0.00508 cm), to facilitate brazing of the joint. Extending downwardly from the upper surface 24 of base plate 18 is a circuitous interior passage 26. The passage is formed by a plurality of arcuate segments extending about the center of base plate 18 at various radii, these arcuate segments being interconnected by a plurality of radially extending segments, as seen in FIGS. 1, 3A and 3D. The circuitous arrangement of passage 26 with several reverse bends ensures that the flow therethrough will be turbulent, which promotes both heating of the gases in the passage and catalytic combining of hydrogen and oxygen. An inlet port 28 shown in FIG. 3A connects passage 26 to a source of gas 30 positioned outside the furnace, by means of a conduit 32.

At the center of base plate 18 is formed a central, heat conducting column 34 of circular configuration, the column preferably extending to the level of upper surface 24. A shallow counterbore 36 in base plate 18 defines a radially inwardly projecting annular ledge 38 which supports a cover plate 40 having a central aperture 42 for receiving heat conducting column 34. The curved walls between the arcuate segments of interior passage 26 extend to and are brazed to the underside of top plate 40, to improve heat conduction. Preferably, the upper surface 44 of the column and the upper surface 46 of the cover plate are essentially coplanar, as illustrated. Also, cover plate 40 preferably is made from copper so that the walls of interior passage 26 all will be of this catalytic material in the preferred embodiments. For ease in sealing cover plate 40 to base plate 18, soldering grooves 48 and 50 are provided on the outside diameters of column 34 and cover plate 42. Prior to assembly of base plate 18 and cover plate 40, these grooves are filled with suitable soldering material which is melted to form the necessary seal by applying heat to the assembled heat exchanger element, as will be understood by those skilled in the mechanical arts.

Though copper is the preferred material for base plate 18, cover plate 40 and other elements, subsequently discussed, which contact the gases flowing from source 30, the use of solid copper elements is not mandatory. The material should have a high thermal conductivity comparable to that of copper. If desired, the various elements may be laminated or plated with a layer of copper or other material which catalyses the combination of hydrogen and oxygen. The passages within the heat exchanger element 12 and the walls of the chamber 22 should, at least in part, be covered with copper or similar catalytic material both to enhance conduction of heat and catalytic removal of oxygen.

Gas flowing through interior passage 26 eventually leaves the passage through at least one opening, but preferably a plurality of openings 52 which form a manifold through cover plate 40. Opening 52 preferably are just above at least one, but preferably the final, radially outermost arcuate segment 54 of the passage, so that the heated, oxygen free gases enter furnace chamber 22 near its periphery.

To define chamber 22, an enclosure is provided in the form of an upper, circumferentially extending annular support flange 56 of a material such as stainless steel. A radially inwardly projecting thin flange 58 supports an upper plate 60 having a lower surface 62 facing surfaces 44, 46. Preferably, plate 60 is solid copper but it may be copper plated, as previously indicated, provided its overall thermal conductivity is high. To facilitate brazing, the diametral clearance between upper plate 60 and flange 58 preferably is quite small, in the manner previously discussed. Also to prevent leakage into chamber 22, a seal such as an O-ring 64 is provided between support flanges 16 and 56 which, in turn, are clamped to each other using bolts 66 and nuts 68 in the manner illustrated, only a few of the several pairs of bolts and nuts having been shown for simplicity. If desired, flange 56 may be hinged to flange 16 to facilitate use of the furnace. In either event, upper flange 56 and plate 60 are easily removable to permit insertion and removal of objects to be heated. And, since the objects are readily accessible when chamber 22 has been opened, final alignments of chips to substrates, for example, are facilitated. To provide adequate clearance to an underlying support surface, some of the bolts 66 are made longer and provided with stand-off sleeves or washers 70, so that a suitable number of legs is formed.

Contacting the upper and lower surfaces, respectively, of upper plate 60 and heat exchanger base plate 18 are flat electrical heater disks 72 and 74, which are held in place by central bolts 76, 78 threaded into the plates themselves. To reduce heat losses, a pair of polished metal or silvered glass reflectors 80, 82 are also held by bolts 76, 78 but are spaced from the heaters by means such as insulating washers 84, 86.

Surface 62 and surfaces 44, 46 preferably are close to each other and parallel. The spacing between these surfaces was only about 0.3125 inch (0.794 cm) in one actual embodiment of the invention used for joining electronic chips to substrates. As a result of this close spacing, gas already heated within passage 26 enters chamber 22 through openings 52 and at flows as low as one liter per minute, will bounce back and forth between these surfaces in a turbulent fashion as indicated by the arrows in FIG. 1. The turbulent flow improves initial flushing of chamber 22 and the efficiency of convective heating in the chamber. Since chamber 22 is just large enough to hold the objects to be heated, the amount of gas which must be flushed out of the system at the beginning of a cycle is small, as is and the total amount of gas required to complete a heating and cooling cycle. Thus, a substrate 88 supporting chips 90 and resting on surfaces 44, 46 will be heated from below by direct conduction through base plate 18, central column 34 and cover plate 40, from the surroundings of chamber 22 by convection from the hot, turbulent gases and from above by radiation from upper plate 60. Once the furnace has reached equilibrium, which occurs rather rapidly, the substrate and chips are bathed in a flow of essentially isothermal gas having a low oxygen content. Thus, an essentially isothermal temperature distribution across the substrate is achieve, having no than about 2° C. maximum variation from point to point.

Figure 2:
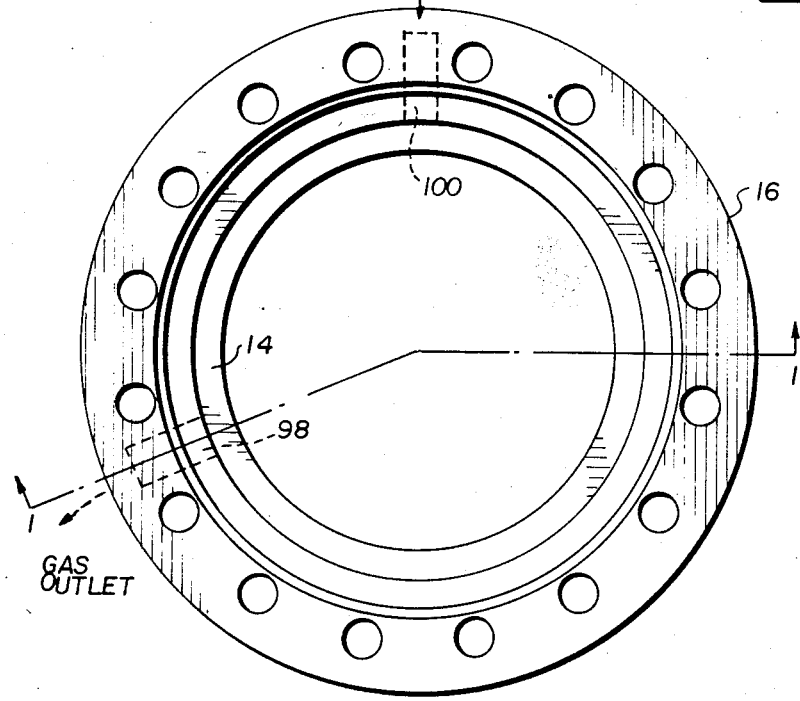
FIG. 2 shows a plan view of the lower support flange shown in section in FIG. 1.
Figure 3:
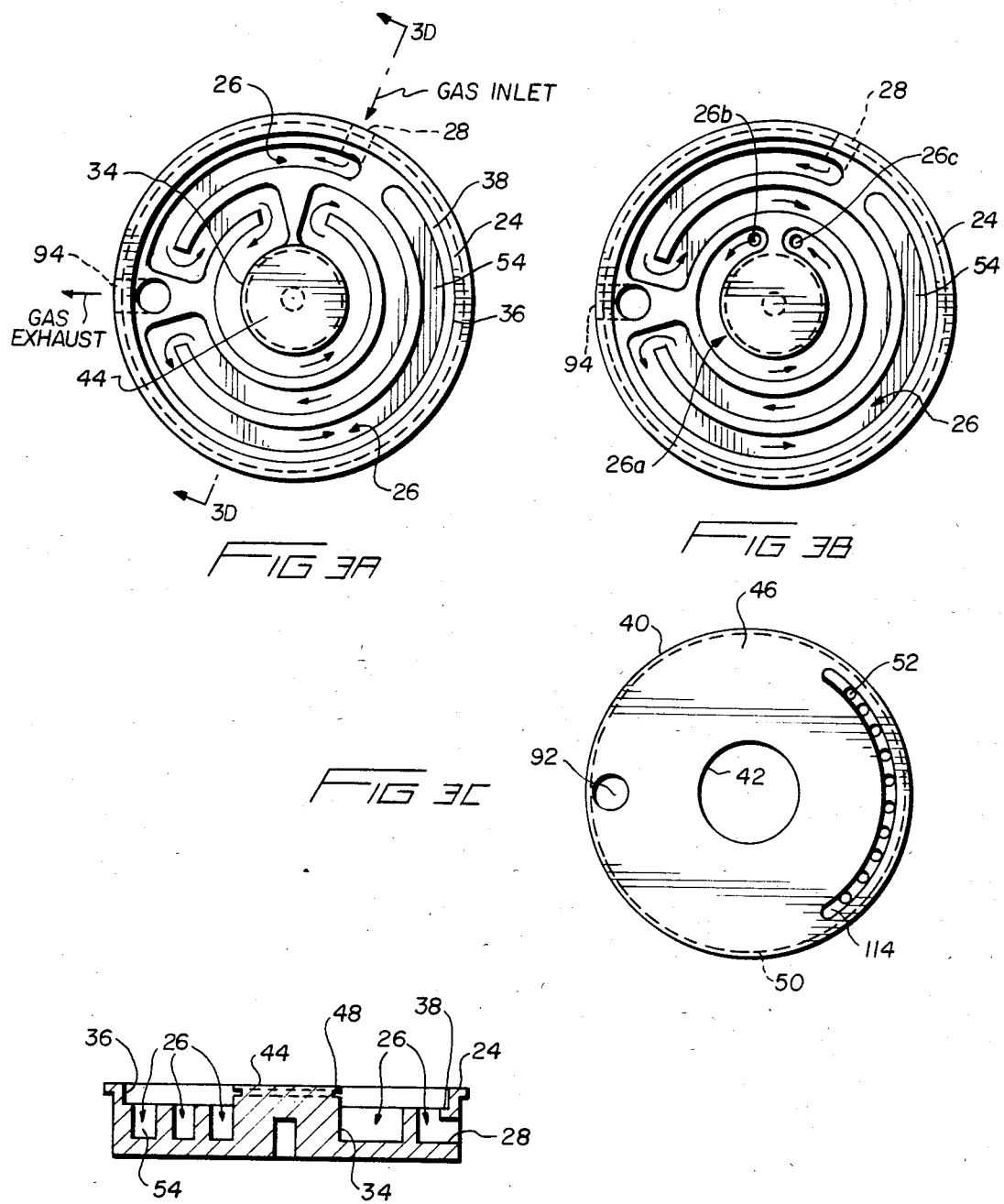
FIG. 3A shows a plan view of the heat exchanger base plate shown in section in FIG. 1.
FIG. 3B shows a plan view of an alternative form of the heat exchanger base plate including both gas heating channels and coolant channels.
FIG. 3C shows a plan view of the heat exchanger cover plate shown in section in FIG. 1.
FIG. 3D shows an elevational view in section along line 3D—3D in FIG. 3A.

Exhaust of the hot gases from chamber 22 is achieved by means of at least one opening 92 through cover plate 40 into an interior exhaust passage 94 in base plate 18. Preferably, opening 92 is positioned opposite to openings 52 so that the hot turbulent gases flow completely across surfaces 44, 46 to uniformly heat the objects resting thereon. A conduit 96 extends from passage 94 to a suitable exhaust point for the hot gases. To facilitate the passage of exhaust conduit 96 and also inlet conduit 32, lower support flange 16 includes arcuate notches 98, 100 on its underside as shown in FIGS. 1 and 2.

Figure 4:
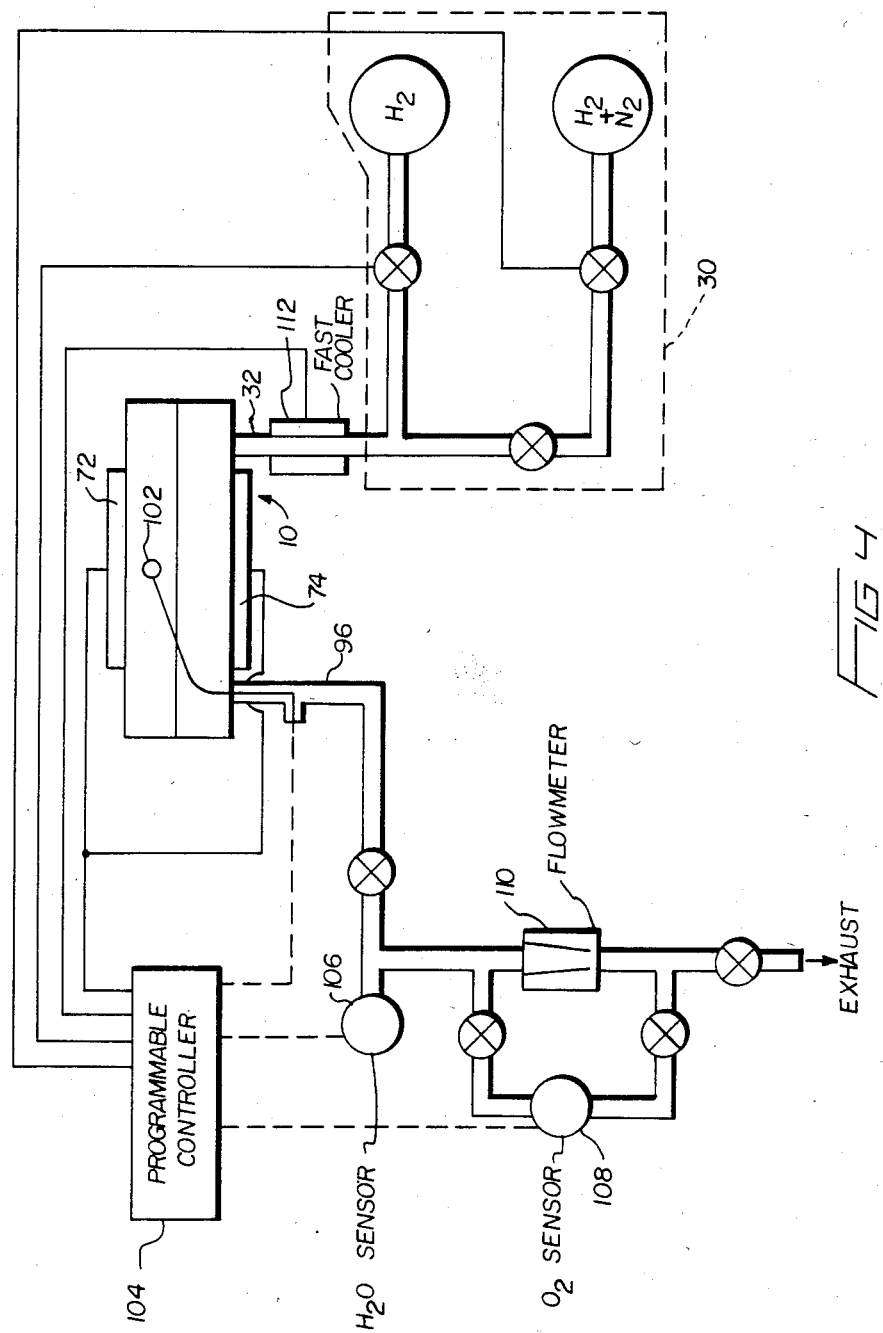
FIG. 4 shows a schematic diagram of the pneumatic and electrical circuits of the apparatus according to the invention.

FIG. 4 shows schematically a complete system embodying the furnace shown in FIGS. 1 to 3C. Heaters 72, 74 are electrically connected in parallel and have the same wattage. The heaters are wired in parallel and their operation is controlled with a single control thermocouple 102 which senses, for example, the surface temperature of substrate 88 and actuates a programmable controller 104. A self-compensating effect is achieved which ensures that the heaters will track each other accurately since the bottom heater 74, which carries the greater thermal load, automatically calls for more power.

The exhaust gases in conduit 96 are directed past a water vapor sensor 106, which signals the vapor content to controller 104. An oxygen sensor 108 and flow meter 110 also are provided. The oxygen sensor may be upstream or downstream of the water vapor sensor. The presence of excess oxygen in the exhaust gases, compared to the known initial oxygen concentration, usually indicates leakage into the furnace chamber from the ambient. Such excess oxygen can lead to degradation of reflowed solder joints, for example. So, the output signal of sensor 108 also is supplied to controller 104 which preferaby is set to shut off heaters 72, 74 should the oxygen content exceed a preselected limit of, say, two parts per million when joining chips to substrates. A fast cooler 112, such as a thermoelectric cooler of known design, may be provided in inlet conduit 32 should it be necessary or desirable to cool the furnace quickly at any time. Alternatively, as shown in FIG. 3B, the innermost arcuate segment of passage 26 in base plate 18 may be closed to define an annular coolant passage 26a having an inlet 26b and an outlet 26c for a suitable coolant such as water or oil. A similar coolant passage, not illustrated, also may be provided in upper plate 60. Such coolant passages will provide accelerated cooling of the base plate, upper plate and gases when needed for a given product.

In one actual embodiment of the furnace shown in FIGS. 1, 2, 3A, 3C and 3D, the furnace was sized to receive substrates about 2.625 inch (6.668 cm) in diameter. Support flanges 16, 56 were made from stainless steel. The inside diameter of flange 14 was 3.376 inch (8.575 cm) plus 0.0005 inch (0.001 cm), minus zero. To provide a fit suitable for brazing, the smaller outside diameter of copper base plate 18 was 3.375 inch (8.573 cm) plus zero, minus 0.0005 inch (0.001 cm). The overall thickness of base plate 18 was 0.625 inch (1.588 cm); and of cover plate 40, 0.0625 inch (0.1588 cm).

Similarly, the inside diameter of flange 58 was 3.251 inch (8.258 cm) plus 0.0005 inch (0.001 cm), minus zero; and the smaller outside diameter of copper upper plate 60 was 3.250 inch (8.255 cm) plus zero, minus 0.0005 inch (0.001 cm). The thickness of upper plate 60 was 0.1875 inch (0.476 cm). Flanges 14 and 58 were positioned to ensure that surface 62 of top plate 60 and surfaces 44, 46 of heat exchanger member 12 were parallel and approximately 0.3125 inch (0.794 cm) apart.

On base plate 18, the diameter of heat conducting column 34 was 1.000 inch (2.54 cm), plus zero, minus 0.0002 inch (0.0005 cm). The depth of the various arcuate and radial segments of interior passage 26 was about 0.375 inch (0.953 cm); the radial width of these segments was about 0.250 inch (0.635 cm); and the radial thickness of the walls separating these segments was about 0.125 inch (0.378 cm). Preferably, the cross-sectional area of the internal passage 26 is larger than that of conduit 32 from gas source 30, so that the dwell time of the gases within the passage is increased, leading to improved heating efficiency. The diameter of inlet port 28 was about 0.250 inch (0.635 cm); and that of exhaust port 94, about 0.3125 inch (0.794 cm). In cover plate 40, the diameter of aperture 42 was 1.001 inch (2.543 cm), plus 0.0002 inch (0.0005 cm), minus zero. Ten openings 52 with diameters of about 0.125 inch (0.378 cm) were provided through cover plate 40 at radii of 1.375 inch (3.493 cm), over an arc of about 90° and at a location symmetrically opposite to exhaust port 94. Tests have shown that if the diameter of openings 52 is reduced, say, to about 0.090 inch (0.229 cm), flow through the openings may drop off so much that turbulent flow is lost, Thus, care was taken in selecting the dimensions so that the furnace would operate in the turbulent flow regions. The exit faces of openings 52 were positioned in a recess 114 below upper surface 46. The recess was 0.125 inch (0.378 cm) wide and 0.0313 inch (0.0794 cm) deep over an arc of about 110°. Identical heaters 72, 74 were Model No. HSP-30 made by the Chromalox Corporation and each had a power rating of 600 watts.

Figure 5:
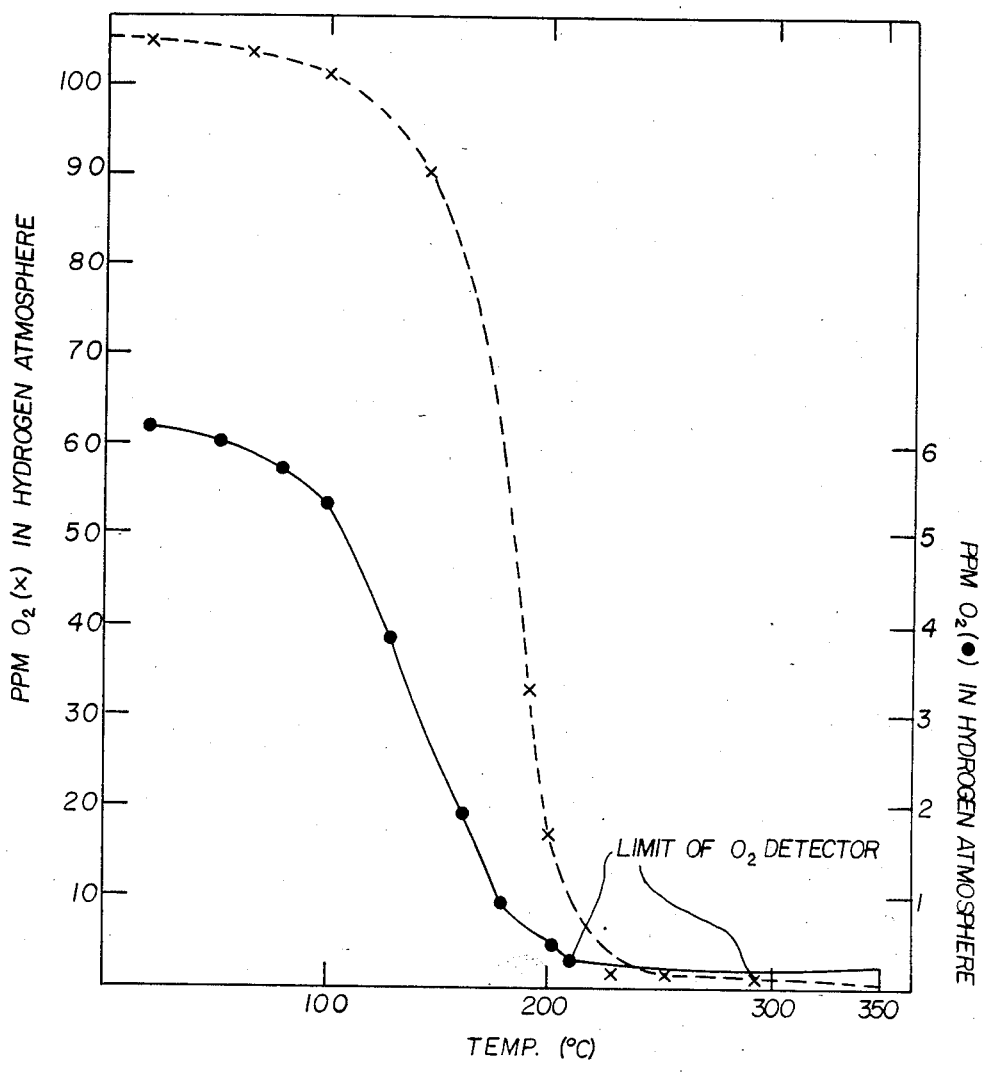
FIG. 5 shows a plot of oxygen concentration versus temperature in the apparatus according to the invention, for two initial values of oxygen in a hydrogen atmosphere.
Figure 6:
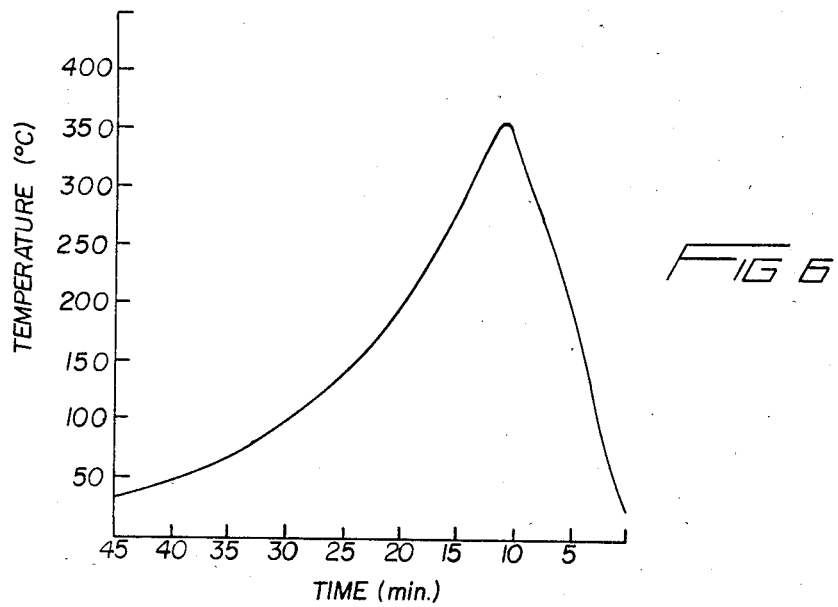
FIG. 6 shows a plot of chip temperature versus time in the apparatus according to the invention, with subsequent air cooling.

Those skilled in the art will understand that the invention is not limited to this specific example and that the various parameters given may be scaled up or down to provide a furnace with a chamber 22 only somewhat larger than the part to be heated. For example, the example given has been scaled upward by about a factor of four with no significant change in performance When source 30 provides either forming gas or hydrogen, the heated copper surfaces of interior passage 26 act as catalytic surfaces for the reaction of hydrogen and oxygen. FIGS. 5 shows the actual performance of the specific example described above. In experiments with flow rates of one liter per minute of hydrogen having rather low initial concentration of oxygen, heaters 72, 74 were operated from room temperature to produce a ramping rate of 35° C. per minute, which compares favorably to that of continuous belt furnaces. The pressure was 10 KPa. An initial concentration of more than 100 parts per million oxygen in chamber 22 was reduced to less than one part per million in less than two minutes. An initial concentration of more than 6 parts per million oxygen was reduced to less than one part per million even more quickly. Such oxygen levels can be maintained in belt furnaces only with very high gas flows from pure gas sources. In contrast, a furnace configured in accordance with the invention permits the use of less pure gases for source 30 but ensures very low oxygen concentrations within furnace chamber 22. The specific furnace described above also is capable of faster ramping rates as high as 45° C. per minute, as illustrated for example in FIG. 6. Here, the furnace was heated from room temperature to 350° C., a typical temperature for joining chips to substrates, in about 10 to 15 minutes and then allowed to air cool. Even without forced cooling, the cycle time was only about 45 minutes.

While the invention has been shown and described with reference to particular embodiments thereof, those skilled in the art will understand that variations in the form and detail of the apparatus and method may be made without departing from the spirit and scope of the invention.

Having thus described our invention in sufficient detail to enable those skilled in the art to make and use it, we claim as new and desire to secure Letters Patent for:

1. An improved apparatus for rapidly heating objects, such as electronic chips being bonded to substrates by application of heat, to a desired temperature and for maintaining the objects essentially isothermally at the desired temperature in an essentially oxygen-free atmosphere, said apparatus comprising:
   a source of gas comprising hydrogen and having a low oxygen content;
   a heat exchanger member formed at least in part from a material which catalyses combination of oxygen and hydrogen, said member comprising a circuitous interior passage with walls formed at least in part from said material, said passage being connected to said source for receiving said gas, said member further comprising an upper surface for supporting said objects during heating;
   means for directing gas from said interior passage across said upper surface to heat objects supported thereon;
   means for applying heat to said heat exchanger member and said interior passage, whereby said oxygen content is substantially removed from said gas by catalysis under the influence of said material and the temperature of said gas is raised to said desired temperature prior to leaving said interior passage through said means for directing;
   means operatively associated with said heat exchanger member for enclosing said upper surface to define a heating chamber within which said gas flows across said objects to maintain them at said essentially isothermal temperature; and
   means for exhausting said gas from said chember;
   said heat exchanger member comprising a base plate formed from a metal of high thermal conductivity, said plate having a first surface for contacting said means for applying heat and a second surface, said circuitous interior passage opening through said second surface, and a cover plate formed from a metal of high thermal conductivity for closing said interior passage at said second surface, said cover plate comprising said upper surface.

2. Apparatus according to claim 1, wherein said means for directing comprises at least one first opening through said cover plate into said interior passage.

3. Apparatus according to claim 2, wherein said means for exhausting comprises an interior exhaust passage extending within said base plate and opening through said second surface and at least one second opening through said cover plate into said exhaust passage at a location opposite said at least one first opening.

4. Apparatus according to claim 2, wherein said means for directing comprises a plurality of openings through said cover plate into said interior passage, said openings being positioned along a portion of the periphery of said cover plate at a location opposite to said means for exhausting.

5. Apparatus according to claim 1, wherein said metal is copper.

6. Apparatus according to claim 1, wherein said base plate comprises a central heat conducting column extending at least to said second surface, whereby heat is conducted directly to the central area of said cover plate to heat said objects on said upper surface.

7. Apparatus according to claim 6, wherein said cover plate comprises a central aperture through which said heat conducting column extends, said column terminating at and forming an extension of said upper surface.

8. Apparatus according to claim 7, wherein said cover plate is sealed to said base plate and said heat conducting column.

9. Apparatus according to claim 1, wherein said circuitous passage comprises a plurality of arcuate segments extending about the center of said base plate at various radii and a plurality of radial segments interconnecting said arcuate segments to complete said passage.

10. Apparatus according to claim 9, wherein said means for exhausting comprises an interior exhaust passage extending within said base plate and opening through said second surface and at least one further opening through said cover plate into said exhaust passage; and said means for directing comprises a plurality of openings through said cover plate into said interior passage, said openings being positioned along the periphery of said cover plate above at least one of said arcuate segments at a location opposite to said at least one further opening.

11. Apparatus according to claim 1, wherein said means for enclosing comprises an upper plate having a lower surface, means for applying heat to said upper plate, means for supporting said upper plate with said lower surface spaced from said upper surface to define said heating chamber and means for sealing the periphery of said chamber.

12. Apparatus according to claim 11, wherein said heat exchanger member and said upper plate are formed from a material having high thermal conductivity and said two means for applying heat comprise first and second electrically powered heating elements each respectively heating one of said heat exchanger member and said upper plate, said heating elements being electrically connected in parallel.

13. Apparatus according to claim 11, wherein said means for supporting comprises a lower, circumferentially extending support flange having a central opening within which said heat exchanger member is positioned and an upper, circumferentially extending support flange having a central opening within which said upper plate is supported; said means for sealing being positioned between said support flanges; further comprising means for clamping said flanges together.

14. Apparatus according to claim 11, further comprising first and second means, positioned adjacent to the exteriors of said two means for applying heat, for reflecting heat back toward the apparatus and thermally shielding the environment thereof.

15. Apparatus according to claim 14, wherein said first and second means for reflecting heat comprises first and second polished metal disks, each spaced from the exterior of one of said two means for applying heat.

16. Apparatus according to claim 11, wherein the walls of said interior passage, said upper surface and said lower surface are formed at least in part from copper.

17. An improved apparatus for rapidly heating objects, such as electronic chips being bonded to substrates by application of heat, to a desired temperature and for maintaining the objects essentially isothermally at the desired temperature in an essentially oxygen-free atmosphere, said apparatus comprising:
   a source of gas comprising hydrogen and having a low oxygen content;
   a heat exchanger member formed at least in part from a material which catalyses combination of oxygen and hydrogen, said member comprising a circuitous interior passage with walls formed at least in part from said material, said passage being connected to said source for receiving said gas, said member further comprising an upper surface for supporting said objects during heating;
   means for directing gas from said interior passage across said upper surface to heat objects supported thereon;
   means for applying heat to said heat exchanger member and said interior passage, whereby said oxygen content is substantially removed from said gas by catalysis under the influence of said material and the temperature of said gas is raised to said desired temperature prior to leaving said interior passage through said means for directing;
   means operatively associated with said heat exchanger member for enclosing said upper surface to define a heating chamber within which said gas flows across said objects to maintain them at said essentially isothermal temperature, said means for enclosing comprising an upper plate having a lower surface, means for applying heat to said upper plate, means for supporting said upper plate with said lower surface spaced from said upper surface to devine said heating chamber, and means for sealing the periphery of said chamber; and
   means for exhausting said gas from said chamber.

18. Apparatus according to claim 17, wherein said heat exchanger member and said upper plate are formed from a material having high thermal conductivity and said two means for applying heat comprise first and second electrically powered heating elements each respectively heating one of said heat exchanger member and said upper plate, said heating elements being electrically connected in parallel.

19. Apparatus according to claim 17, wherein said means for supporting comprises a lower, circumferentially extending support flange having a central opening within which said heat exchanger member is positioned and an upper, circumferentially extending support flange having a central opening within which said upper plate is supported; said means for sealing being positioned between said support flanges; further comprising means for clamping said flanges together.

20. Apparatus according to claim 17, further comprising first and second means, positioned adjacent to the exteriors of said two means for applying heat, for reflecting heat back toward the apparatus and thermally shielding the environment thereof.

21. Apparatus according to claim 20, wherein said first and second means for reflecting heat comprises first and second polished metal disks, each spaced from the exterior of one of said two means for applying heat.

22. Apparatus according to claim 17, wherein the walls of said interior passage, said upper surface and said lower surface are formed at least in part from copper.

23. An improved apparatus for rapidly heating objects, such as electronic chips being bonded to substrates by application of heat, to a desired temperature and for maintaining the objects essentially isothermally at the desired temperature in an essentially oxygen-free atmosphere, said apparatus comprising:
   a source of gas comprising hydrogen and having a low oxygen content;
   a heat exchanger member formed at least in part from a material which catalyses combination of oxygen and hydrogen, said member comprising a circuitous interior passage with walls formed at least in part from said material, said passage being connected to said source for receiving said gas, said member further comprising an upper surface for supporting said objects during heating;
   means for directing gas from said interior passage across said upper surface to heat objects supported thereon;
   means for applying heat to said heat exchanger member and said interior passage, whereby said oxygen content is substantially removed from said gas by catalysis under the influence of said material and the temperature of said gas is raised to said desired temperature prior to leaving said interior passage through said means for directing;
   means operatively associated with said heat exchanger member for enclosing said upper surface to define a heating chamber within which said gas flows across said objects to maintain them at said essentially isothermal temperature;
   means for sensing the oxygen content of the gas flowing through said means for exhausting and for shutting off said means for applying heat when said oxygen content exceeds a preselected limit; and
   means for exhausting said gas from said chamber.

24. An improved apparatus for rapidly heating objects, such as electronic chips being bonded to substrates by application of heat, to a desired temperature and for maintaining the objects essentially isothermally at the desired temperture in an essentially oxygen-free atmosphere, said apparatus comprising:
   a source of gas comprising hydrogen and having a low oxygen content;
   a heat exhanger member formed at least in part from a material which catalyses combination of oxygen and hydrogen, said member comprising a circuitous interior passage with walls formed at least in part from said material, said passage being connected to said source for receiving said gas, said member further comprising an upper surface for supporting said objects during heating;

means for directing gas from said interior passage across said upper surface to heat objects supported thereon;

means for applying heat to said heat exchanger member and said interior passage, whereby said oxygen content is substantially removed from said gas by catalysis under the influence of said material and the temperature of said gas is raised to said desired temperature prior to leaving said interior passage through said means for directing;

means operatively associated with said heat exchanger member for enclosing said upper surface to define a heating chamber within which said gas flows across said objects to maintain them at said essentially isothermal temperature;

an upper, heat conductive plate spaced from said upper surface and a further means for applying heat to said upper plate, said two means for applying heat comprising first and second electrically powered heating elements each respectively heating one of said heat exchanger element and said upper plate, said heating elements being electrically connnected in parallel; and means for exhausting said gas from said chamber.

25. An improved apparatus for rapidly heating objects, such as electronic chips being bonded to substrates by application of heat, to a desired temperature and for maintaining the objects essentially isothermally at the desired temperature in an essentially oxygen-free atmosphere, said apparatus comprising:

a source of gas comprising hydrogen and having a low oxygen content;

a heat exchanger member formed at least in part from a material which catalyses combination of oxygen and hydrogen, said member comprising a circuitous interior passage with walls formed at least in part from said material, said passage being connected to said source for receiving said gas, said member further comprising an upper surface for supporting said objects during heating;

means for directing gas from said interior passage across said upper surface to heat objects supported thereon;

means for applying heat to said heat exchanger member and said interior passage, whereby said oxygen content is substantially removed from said gas by catalysis under the influence of said material and the temperature of said gas is raised to said desired temperature prior to leaving said interior passage through said means for directing;

means operatively associated with said heat exchanger member for enclosing said upper surface to define a heating chamber within which said gas flows across said objects to maintain them at said essentially isothermal temperature;

a coolant passage formed within said heat exchanger member for receiving a flow of coolant to provide accelerated cooling of said chamber; and means for exhausting said gas from said chamber.

* * * * *